United States Patent Office 3,240,741
Patented Mar. 15, 1966

3,240,741
METHOD OF PIGMENTING GLASS CLOTH WITH SILANES
James K. Campbell, Midland, Mich., assignor to Dow Corning Corporation, Midland, Mich., a corporation of Michigan
No Drawing. Filed Oct. 31, 1962, Ser. No. 234,516
7 Claims. (Cl. 260—29.7)

This invention relates to an improved method for binding pigments to glass fabrics.

The use of glass fibers in fabrics and textiles for draperies and other decorative purposes has increased greatly during recent years. This had led to widespread effort to dye and pigment the glass fibers to secure a wash-fast, light-fast, abrasion resistant, non-crocking finished glass fabric exhibiting acceptable hand and other characteristics.

It is the object of this invention to introduce a novel system for binding pigments to glass fibers. Another object is a pigmented glass cloth wherein the pigmenting is wash-fast, light-fast and non-crocking. A pigmented glass cloth of good hand and abrasion resistance is also an object of this invention. Another object is a simple and effective system for binding pigments to glass cloth. Other objects and advantages of this invention are detailed in or will be apparent from the disclosure and claims following.

This invention relates to a method of binding pigments to glass consisting essentially of treating the glass with an aqueous system (1) containing an organo-silicon compound selected from the group consisting of silanes of the formula $(CH_3O)_3SiCH_2CH_2CH_2NHCH_2CH_2NH_2$ and acetate salts thereof in combination with latex binders selected from the group consisting of acrylic resins, styrene butadiene copolymeric resins and polyvinyl butyral resins, (2) alkyl acrylate and alkyl methacrylate salts of silanes of the formula

wherein each Y is a monovalent substituent selected from hydrocarbon radicals of 1–17 carbon atoms, alkoxy radicals and hydrogen atoms, R″ is a hydrogen atom or an alkyl radical of 1 to 4 carbon atoms, at least one R″ being a hydrogen atom, $x$ is 1 to 11 inclusive, $y$ is 1 to 2 inclusive, R′ is a hydrocarbon radical containing 1–18 carbon atoms being divalent when $y$ is 1 and trivalent when $y$ is 2, and $n$ has a value of 1 to 2 inclusive, and partial hydrolyzates of said salts of silanes, and (3) said alky acrylate and alkyl methacrylate salts of silanes and partial hydrolyzates of said salts in combination with the latex binders selected from the group consisting of acrylic resins, styrene-butadiene copolymers and polyvinyl butyral resins.

The pigments applied to glass cloth are well known materials employed as anionic and nonionic dispersions in water. The pigments are generally metallic compounds of specific color charactertistic but may be such materials as carbon blacks. Illustrative of the pigments employed are: dianisidine blue, phthalocyanine blue, iron oxide black, chlorinated phthalocyanine blue, indanthrene blue GCD, ultramarine blue, indanthrene red violet RRN, lithosol blue, iron oxide brown, iron oxide red, metallized azo brown, indanthrene brown RRD, phthalocyanine green, benzidine orange, pigment green B, chrome orange, indanthrene brilliant orange RK, dianisidine orange, molybdate orange, p-nitro-o-anisidine, p-nitro-o-toluidine, napthol AS–D, helindon pink, indomaroon, indanthrene brilliant violet RR, 6-benzoylamino-4-methoxy-m-toluidene, $TiO_2$, ZnO, benzidene yellow, lithosol fast yellow 3 GD, iron oxide yellow, indanthrene yellow GK, chrome yellow, and lithosol yellow F. Other pigments are, of course, available and would be included within the scope of this case.

The pigments are dispersed in water employing anionic and non-ionic emulsifying agents. A great many of such agents are known and a representative listing can be found in "Detergents and Emulsifiers, 1962," published by John W. McCutcheon, Inc., Morristown, N.J., at pages 11 through 141.

The anionic and nonionic aqueous dispersions of pigment contain a resinous binding agent. The best known of these agents are aqueous solutions and emulsions of polymers and copolymers of methyl and ethyl acrylates and methacrylates and polymers of ethyl, n-propyl, n-butyl and isobutyl methacrylates as well as copolymers and tripolymers of methyl acrylate, methyl methacrylate and vinyl acetate (see "Chemistry of Commercial Plastics," 1947, Reinhold Publishing Co., New York, page 494). Similarly, styrene-butadiene copolymers and polyvinyl-butyral polymers are employed as binders for pigmented glass fabrics. These aqueous systems of organic resinous polymers and copolymers are known in the art. Generally, the aqueous system is prepared by emulsion polymerization techniques. Alternately, the resinous polymer is prepared and dispersed in the water employing high speed mixing equipment and techniques. Any desired organic resin binder in a non-ionic or anionic water system, solution, dispersion or emulsion, can be employed herein.

In addition to the materials set forth above, the aqueous treating systems can contain dulling agents, fabric softeners, lubricants and other additives normally employed in pigmenting and treating solutions for glass fabrics. Such materials are employed in standard proportions.

The crux of this invention involves adding certain organosilicon materials to the aqueous pigmenting system employed to treat glass fabrics. One may add an aminated monoorganosilane such as is disclosed in U.S. Patent No. 2,971,864, issued February 14, 1961, or an acetate salt of such monoorganosilane to the organic resinous binding agents presently employed. The addition of the monoorganosilane results in improved wash-fastness, good abrasion resistance and improved light-fastness as well as acceptable hand in the ultimate pigmented fabric.

The monoorganosilanes are described by the formula $(RO)_3SiR'Z_y$ where R′ is a hydrocarbon radical of less than 19 carbon atoms having a valence of $y+1$, $y$ is 1 or 2, Z is a monovalent radical attached to R′ by C–N bonding and is composed of carbon and hydrogen atoms and at least two amine groups and R is a methyl, ethyl or propyl radical. Preferred are the trimethoxysilanes of the formula $(CH_3O)_3SiCH_2CH_2CH_2NHCH_2CH_2NH_2$ and acetate salts thereof. The acetate salts are somewhat better than the silanes per se in that the salts are more compatible with the balance of the pigmenting solution. The silane and acetate salts of silane are employed as additives with the latex binders. In general, the treating solutions contain pigment and binder in proportions varying from 1 to 5 to 5 to 1 on a weight basis. The binder contains .5 to 20 percent by weight of silane or silane salt and 80 to 99.5 percent by weight of latex and the binder is present to the extent of 0.1 to 10 percent by weight of the treating solution.

The acrylate salts of silanes employed herein are reaction products of (1) silanes of the formula

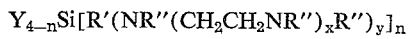

wherein each Y is a hydrocarbon radical of 1 to 18 inclusive carbon atoms, an alkoxy radical or a hydrogen atom, R″ is a hydrogen atom or an alkyl radical of less than 5 carbon atoms, at least one R″ being a hydrogen atom, $x$ is 1 to 11 inclusive, $y$ is 1 to 2 inclusive, R′ is a hydrocarbon radical containing 1–18 inclusive carbon atoms having a valence of $y+1$ and $n$ is 1 or 2 and (2) alkyl acrylate or alkyl methacrylate. These salts of silanes as well as corresponding siloxanes prepared by hydrolyzing and condensing the defined silane salts are disclosed and described in copending U.S. application Serial No. 232,277, filed October 22, 1962, filed by John W. Ryan entitled "Modified Polyalkyleneamine Silicon Compounds."

The acrylate salts described above can be illustrated by the following groups:

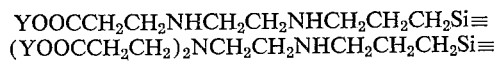

and

(CH$_2$CH$_2$COOY)CH$_2$CH$_2$CH$_2$Si≡ where Y is an alkyl radical. The foregoing illustrative groups are limited to acrylate salts and the corresponding methacrylate salts are identical in structure but the YOOCCH$_2$CH$_2$— group is replaced by a

YOOCCH(CH$_3$)CH$_2$— group. The remaining valences on the silicon atoms in the illustrative groups would be satisfied by oxygen atoms bonded to other silicon atoms to form Si—O—Si siloxane linkages, by alkoxy groups, by hydrogen atoms, and by monovalent hydrocarbon radicals of less than 19 carbon atoms. The disclosure of the copending application of Ryan noted above fully describes these materials and is incorporated herein by reference.

The acrylate and methacrylate salts of silanes and siloxanes defined above can be employed as the binding agent for the pigments. The salts would be employed in proportions of from .2 to 5 parts by weight per 1 part by weight pigment in the treating solution. The treating solution would contain .1 to 10 parts by weight of the salt.

When the acrylate and methacrylate salts of silanes and siloxanes are employed as the sole binding agent, the cost of treating the glass fabric is increased to a point where it may not be commercially practical. Accordingly, it has been found a mixture of the defined acrylate and methacrylate salts and known latex binders provides an excellent binding agent offering wash-resistant, light-resistant, non-crocking pigmented glass fabrics exhibiting excellent hand. The salt is employed in quantities of from .1 to 20 percent by weight of the binder present and the latex binder is employed in quantities of from 80 to 99.9 percent of the binder. Again the binder is employed in weight proportions of from .2 to 5 parts binder per 1 part pigment and the binder is present in the treating solution in amounts of from .1 to 10 percent by weight of the solution.

The glass fabric can be treated by running it through a bath of the pigment-binder solution, by dipping, by flowing, by spraying or by any other desired means. The treated fabric is dried by exposure to warm air or by heating to fix the pigment and binder on the cloth. Generally, a short air cure followed by heating at 100° to 350° C. for 15 seconds to 1 hour will suffice. The conditions of cure are easily established by the fabric producer and are not critical.

The pigmented fabric can be further treated with organic and siloxane water repellents as well as fluorocarbon oleophobic agents. Typical of the organic after-finishes are chrome complexes such as Werner type chromium complexes of myristic acid and stearic acid which can be illustrated by the formulae:

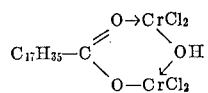

and $$C_{17}H_{35}-C\begin{smallmatrix}O\rightarrow CrCl_2\\ \diagup\\ \diagdown\\ O-CrCl_2\end{smallmatrix}OH$$

Siloxane after finishes are based on mixtures of dimethylsiloxane polymers of 100 to 10,000 cs. viscosity and methylhydrogensiloxane polymers of 5 to 100 cs. viscosity. Curing catalysts such as metal salts of carboxylic acids, alkyls titanates, alkyl zirconates, amines and other known catalysts can be included in the after finishes. Polymers based on fluorocarbon materials can also be employed as after finishes herein. Further detail on these finishes is found in U.S. Patents Nos. 2,588,365–366 and 367, 2,728,692, 2,774,690, 2,807,601, 2,838,423, 2,842,509, 2,884,393, and 2,894,967.

The following examples are included herein to aid those skilled in the art in gaining a better understanding of the invention. The scope of the invention is set forth in the claims and is not limited by the examples. All parts and percentages in the claims are based on weight, all temperatures are measured on the centigrade scale and all viscosities are measured at 25° C. unless otherwise specified.

The spray ratings set forth in the examples were determined in accordance with the American Association of Textile Chemists and Colorists, Standard Test Method 22–1952, which is fully described in the 1960 "Technical Manual and Yearbook of the American Association of Textile Chemists and Colorists," vol. 36, pages 158–160. A spray rating of 100 shows that the fabric is completely water repellent. A spray rating of 50 means that the entire surface of the fabric is wet but no water has soaked through. A spray rating of zero means that the water soaks through the fabric. The crock ratings set forth in the examples were determined in accordance with the American Association of Textile Chemists and Colorists, Standard Test Method 8–1957, which is fully described in the 1960 "Technical Manual and Yearbook of the American Association of Textile Chemists and Colorists," vol. 36, page 87. A crock rating of 5 means that there is no color loss and that very little, if any, of the finish is removed during the test. There is progressively more color and finish loss as the crock rating decreases. A crock rating of 1 means that a large amount of color and finish has been lost. This test was performed on both wet and dry samples. The abrasion resistance was determined by continuously flexing the sample until failure. This test was performed with a Stoll flex abrader. A one-inch wide strip of fabric was used. Three pounds tension was maintained during flexing on the 1/8" rod around which the fabric was wrapped. The vertical head pressure on the sample was 1.5 pounds. The wash-fastness was determined merely by washing the fabric in an automatic washer at 49° C. and observing the amount of pigment lost during washing. The wash-fastness rating scale is as follows: essentially complete color retention, excellent color retention (slight color loss), good color retention, fair color retention, poor color retention and no color retention (essentially complete color loss).

EXAMPLE 1

Heat cleaned commercial glass fabrics were employed in this example and were treated by immersing in anionic aqueous emulsion as follows.

Solution (a) 5 percent of an acrylic resin polymer, 4 percent of blue pigment (Blue 2G), 91 percent water (this is the control or blank).

(b) Identical to (a) but employing 4 percent of a nonionic dispersion of blue pigment and also containing 0.2 percent of the acetic acid salt of a silane of the formula (CH$_3$O)$_3$SiCH$_2$CH$_2$CH$_2$NHCH$_2$CH$_2$NH$_2$ and 90.8 percent water (c) Identical to (a) but also containing 0.2 percent of a methyl acrylate salt of a silane of the formula $(CH_3O)_3SiCH_2CH_2CH_2NHCH_2CH_2NHCH_2CH_2COOCH_3$ and 90.8 percent water (d) Identical to (a) but also containing 0.2 percent of a methyl acrylate salt of a silane of the formula $(CH_3O)_3SiCH_2CH_2CH_2NHCH_2CH_2N(CH_2CH_2COOCH_3)_2$ and 90.8 percent water (e) Identical to (a) but also containing 0.2 percent of a methyl acrylate salt of a silane of the formula $(CH_3O)_3SiCH_2CH_2CH_2N(CH_2CH_2COOCH_3)$
$CH_2CH_2N(CH_2CH_2COOCH_3)_2$ and 90.8 percent water (f) Identical to (a) but also containing an ethyl acrylate salt of the formula $(CH_3O)_3SiCH_2CH_2CH_2NHCH_2$
$CH_2NHCH_2CH_2COOC_2H_5$ and 90.8 percent water (g) Identical to (a) but also containing an ethyl acrylate salt of the formula $(CH_3O)_3SiCH_2CH_2CH_2NHCH_2$
$CH_2N(CH_2CH_2COOC_2H_5)_2$ The treated fabric was air dried and heated to 175° C. for 1.5 minutes. The pigmented glass fabrics were further treated by immersion in a siloxane water repellent finish consisting of an aqueous emulsion containing 1.2 percent of a mixture of 60 parts methylhydrogensiloxane fluid of 50 cs. viscosity and 40 parts of hydroxyl-endblocked dimethylsiloxane polymers of 3500 cs. viscosity, 1.1 parts low molecular weights polyethylene, .1 part zirconium acetate and .06 part zinc acetate. The fabrics were air dried and heated at 175° C. for 1.5 minutes then tested for spray rating (water repellency), abrasion resistance, crock resistance and wash-fastness. The results are tabulated below in Table I.

TABLE I

| Treating Solutions | Spray Rating | Abrasion Resistance | Crock Resistance | | Wash-Fastness | |
|---|---|---|---|---|---|---|
| | | | Dry | Wet | 1 | 3 |
| a | 100 | 769 | 2 | 2 | Fair | None. |
| b | 80 | 1,658 | 1 | 2 | Excellent | Good. |
| c | 100 | 721 | 3 | 3 | do | Do. |
| d | 100 | 996 | 2 | 3 | Good | Fair. |
| e | 100 | 1,271 | 2 | 3 | Fair | Poor. |
| f | 100 | 989 | 2 | 3 | Excellent | Good. |
| g | 100 | 894 | 3 | 3 | Fair | Poor. |

EXAMPLE 2

Following the method of Example 1, samples of glass fabric were treated by immersion in the following solutions:

(h) An anionic aqueous emulsion containing 5 percent of the acrylic resin and 4 percent of the blue pigment employed in emulsion (a) and a second immersion in an emulsion containing 3 percent of the myristic acid chrome complex of the formula $$C_{13}H_{27}C\begin{matrix}O \rightarrow CrCl_2 \\ \diagup \\ OH \\ \diagdown \\ O-CrCl_2\end{matrix}$$

(i) An anionic aqueous emulsion identical to (h) but also containing 0.2 percent of the acetic acid salt of a silane of the formula $(CH_3O)_3SiCH_2CH_2CH_2NHCH_2CH_2NH_2$ and a second immersion in the siloxane water repellent finish employed in Example 1.

(j) An anionic aqueous emulsion identical to (h) but also containing 0.2 percent of a methylacrylate silane salt of formula $(CH_3O)_3Si(CH_2)_3NH(CH_2)_2NHCH_2CH_2COOCH_3$ and a second immersion in the myristic acid chrome complex emulsion of (h).

(k) An anionic aqueous emulsion identical to (j) and a second immersion in the siloxane water repellent finish employed in Example 1.

(l) An anionic aqueous emulsion identical to (h) but also containing 0.5 percent of the methylacrylate silane salt $(CH_3O)_3Si(CH_2)_3NH(CH_2)_2NHCH_2CH_2COOCH_3$ and a second immersion in the myristic acid chrome complex emulsion of (h).

(m) Identical to (l) except the second immersion is in the siloxane water repellent finish employed in Example 1.

After each immersion the fabric was air dried and heated to 175° C. for 1.5 minutes to cure the finish. The treated pigmented fabrics were tested as in Example 1 and the results are tabulated below in Table II.

TABLE II

| Treating Solutions | Spray Rating | Abrasion Resistance | Crock Resistance | | Wash-Fastness | |
|---|---|---|---|---|---|---|
| | | | Dry | Wet | 1 | 3 |
| h | 90 | 1,546 | 1 | 3 | Good | Fair. |
| i | 80 | 1,363 | 2 | 3 | Excellent | Good. |
| j | 80 | 887 | 1 | 2 | No loss | Excellent. |
| k | 90 | 1,207 | 2 | 3 | Excellent | Good. |
| l | 80 | 889 | 2 | 2 | No loss | Excellent. |
| m | 90 | 1,288 | 2 | 3 | Excellent | Good. |

EXAMPLE 3

Employing the methods set forth in Example 1, heat cleaned glass cloth was treated with the following aqueous systems:

(n) Solution (a) followed by a second immersion in the chrome complex described in (h).

(n') Solution (a) followed by a second immersion in the siloxane water repellent finish described in Example 1.

(p) Identical to (n) but 0.5 percent of an acetic acid salt of the silane $(CH_3O)_3Si(CH_2)_3NH(CH_2)_2NH_2$ was added to solution (a).

(p') Identical to (n') but 0.5 percent of the acetic acid salt of the silane $(CH_3O)_3Si(CH_2)_3NH(CH_2)_2NH_2$ was added to solution (a).

(q) An anionic aqueous emulsion containing 0.5 percent of acetic acid salt of the silane $(CH_3O)_3Si(CH_2)_3NH(CH_2)_3NH_2$ and 4 percent of a commercial blue pigment (SXN Blue) followed by a second immersion in the chrome complex described in (h).

(q') Identical to (q) but second immersion is in the siloxane water repellent finish described in Example 1.

(r) An anionic aqueous emulsion containing 0.5 percent of silane of the formula $$(CH_3O)_3Si(CH_2)_3NH(CH_2)_2NHCH_2CH_2COOC_2H_5$$

and 4 percent of commercial blue pigment (SXN Blue) followed by second immersion in the chrome complex described in (h).

(r') Identical to (r) but replacing the chrome complex immersion by an immersion in the siloxane water repellent finish described in Example 1.

(s) An anionic aqueous emulsion containing 0.5 percent of $$(CH_3O)_3Si(CH_2)_3NH(CH_2)_2NHCH_2CH_2COOCH_3$$

and 4 percent of the commercial blue pigment (SXN Blue) and a second immersion in the chrome complex described in (h).

(s') Identical to (s) but replacing the chrome complex immersion by an immersion in the siloxane water repellent finish described in Example 1.

The results are set forth in Table III below.

TABLE III

| Treating Solutions | Spray Rating | Abrasion Resistance | Crock Resistance | | Wash-Fastness | |
|---|---|---|---|---|---|---|
| | | | Dry | Wet | 1 | 3 |
| n | 80 | 1,290 | 2 | 2 | Excellent | Fair. |
| n' | 80 | 2,613 | 2 | 3 | Fair | Poor. |
| p | 80 | 2,104 | 2 | 1-2 | No losss | Excellent. |
| p' | 90 | 1,027 | 1 | 2 | Excellent | Good. |
| q | 100 | 808 | 1 | 1 | Good | Poor. |
| q' | 100 | 802 | 1 | 2 | Excellent | Fair. |
| r | 100 | 719 | 1 | 1 | ___do___ | Poor. |
| r' | 100 | 573 | 1 | 2 | ___do___ | Fair. |
| s | 90-100 | 672 | 1 | 1 | Good | Do. |
| s' | 100 | 436 | 1 | 1 | ___do___ | Do. |

EXAMPLE 4

Pigmented glass fabrics having spray ratings of 80–100, excellent abrasion resistance, acceptable crock resistance and excellent wash-fastness and light-fastness are obtained when anionic pigments are bound to glass fabric employing .5 percent of the aqueous treating solution of the following compositions: (1)

$$(CH_3O)_3Si(CH_2)_3NH(CH_2)_2NH_2$$

admixed with a styrene butadiene latex in proportions of 1/4; (2) ethyl methacrylate salts of $$(CH_3O)_3Si(CH_2)_3NH(CH_2)_2NH_2$$

and (3) a propyl acrylate salt of $$(CH_3O)_2CH_3Si(CH_2)_3NH(CH_2)_2NH_2$$

That which is claimed is:

1. A method of binding pigments to glass fibers comprising contacting the glass fibers with an aqueous system containing (a) pigment, (b) emulsifying agent selected from the group consisting of anionic and nonionic emulsifying agents, and (c) a binding agent selected from the group consisting of (1) a mixture of a silane of the formula $(RO)_3SiR'Z_y$ where each R' is an aliphatic hydrocarbon radical of less than 19 carbon atoms having a valence of $y+1$, $y$ has a value from 1 to 2 inclusive, Z is a monovalent radical attached to a carbon atom in the R' radical by C—N bonding and is composed of carbon and hydrogen atoms and from two to four inclusive amine groups and R is an alkyl radical of less than 4 carbon atoms in combination with a latex binder selected from the group consisting of acrylic polymeric and copolymeric resins, styrene-butadiene copolymer resins and polyvinyl butyral resins, (2) a mixture of an acetate salt of the silane defined in (1) and a latex binder as defined in (1), (3) an acrylate salt of a silane selected from the group consisting of alkyl acrylate and alkylmethacrylate salts of silanes of the general formula $$Y_{4-n}Si[R'(NR''(CH_2CH_2NR'')_xR'')_y]_n$$

wherein each Y is selected from the group consisting of monovalent hydrocarbon radicals of 1–18 inclusive carbon atoms, alkoxy radicals of less than 4 carbon atoms and hydrogen atoms, R'' is selected from the group consisting of hydrogen atoms and alkyl radicals of less than 5 carbon atoms, at least one R'' being a hydrogen atom, $x$ has a value from 1–11 inclusive, $y$ has a value from 1–2 inclusive, R' is a hydrocarbon radical having a valence of $y+1$ containing from 1 to 18 inclusive carbon atoms, and $n$ has a value from 1 to 2 inclusive, (4) siloxanes prepared by partial hydrolysis of the acrylate salts of a silane defined in (3), (5) mixtures of the acrylate salt of a silane defined in (3) and a latex binder selected from the group consisting of acrylic polymeric and copolymeric resins, styrene-butadiene copolymeric resins and polyvinyl butyral resins, and (6) mixtures of siloxanes prepared by partial hydrolysis of the acrylate salts of a silane defined in (3) and a latex binder selected from the group consisting of acrylic polymeric and copolymeric resins, styrene-butadiene copolymeric resins and polyvinyl butyral resins, and thereafter drying the glass fibers to fix the pigment and binding agent on the fibers.

2. In a method for binding pigments to glass fibers the improvement consisting of adding to the pigment emulsion a binder consisting essentially of a mixture of .1 to 20 parts by weight of an organosilicon compound selected from the group consisting of silanes of the formula $(RO)_3SiR'Z_y$ wherein R' is an aliphatic hydrocarbon radical of less than 19 carbon atoms having a valence of $y+1$, $y$ has a value of from 1 to 2 inclusive, Z is a monovalent radical attached to R' by C—N bonding and is composed of carbon and hydrogen atoms and at least 2 amine groups and R is an alkyl radical of from 1 to 3 inclusive carbon atoms, and acetate salts of said silanes and 80 to 99.9 parts by weight of a latex pigment binder selected from the group consisting of acrylic polymeric and copolymeric resins, styrene-butadiene copolymeric resins and polyvinyl butyral resins.

3. The method of claim 2 wherein the organosilicon compound is $(CH_3O)_3Si(CH_2)_3NHCH_2CH_2NH_2$.

4. The method of claim 2 wherein the organosilicon compound is an acetate salt of $$(CH_3O)_3Si(CH_2)_3NHCH_2CH_2NH_2$$

5. In a method for binding pigments to glass fibers the improvement consisting of adding to the pigment emulsion as a binder an acrylate salt of silanes selected from the group consisting of alkyl acrylate and alkyl methacrylate salts of silanes of the formula $$Y_{4-n}Si[R'(NR''(CH_2CHR'')_xR'')_y]_n$$

wherein each Y is a monovalent substituent selected from hydrocarbon radicals of 1–18 inclusive carbon atoms, alkoxy radicals and hydrogen atoms, R'' is selected from the group consisting of hydrogen atoms and alkyl radicals of less than 5 carbon atoms, at least one R'' being a hydrogen atom, $x$ has a value from 1 to 11 inclusive, $y$ has a value of from 1 to 2 inclusive, R' is a hydrocarbon radical having a valence of $y+1$ containing from 1 to 18 inclusive carbon atoms and $n$ has a value from 1 to 2 inclusive.

6. The method of claim 5 wherein Y is methoxy, $n$ is 3, R' is —$CH_2CH_2CH_2$—, $y$ is 1, R" is hydrogen and $x$ is 1.

7. The method of claim 5 further characterized in that the binder is a mixture of the defined acrylate salt of silane and an organic latex selected from the group consisting of acrylic polymeric and copolymeric resins, styrene-butadiene copolymeric resins and polyvinyl butyral resins.

References Cited by the Examiner
UNITED STATES PATENTS

| | | | |
|---|---|---|---|
| 2,756,220 | 7/1956 | Brooks et al. | 260—41.5 |
| 2,971,864 | 2/1961 | Speier | 260—448.8 |

MURRAY TILLMAN, *Primary Examiner.*

LOUISE P. QUAST, *Examiner.*